(12) United States Patent
Danner et al.

(10) Patent No.: US 7,411,948 B2
(45) Date of Patent: Aug. 12, 2008

(54) ETHERNET SWITCH

(75) Inventors: Phillip A. Danner, Earlysville, VA (US);
William B. Estep, Keswick, VA (US);
Paul D. Scanlon, Earlysville, VA (US);
Robert A. Rucinski, Charlottesville, VA (US); Robert A. McKeel, Charlottesville, VA (US)

(73) Assignee: General Electric Company, Schenectady, NY (US)

( * ) Notice: Subject to any disclaimer, the term of this patent is extended or adjusted under 35 U.S.C. 154(b) by 1246 days.

(21) Appl. No.: 09/682,883

(22) Filed: Oct. 29, 2001

(65) Prior Publication Data

US 2003/0081604 A1    May 1, 2003

(51) Int. Cl.
*H04Q 11/00* (2006.01)
*H04L 12/50* (2006.01)
*H04L 12/28* (2006.01)
*H04L 12/56* (2006.01)

(52) U.S. Cl. ................................. 370/372; 370/389

(58) Field of Classification Search ......... 370/385–395, 370/372, 401, 338, 466, 316, 470, 314, 352, 370/400, 230, 380, 353, 446, 421, 241, 216, 370/465, 413, 439, 251, 503; 356/231, 230; 401/338; 225/351; 400/252; 255/420; 709/228–238, 709/240, 204, 217, 200, 224, 208, 223, 205, 709/242; 710/11, 62; 348/370; 380/270; 340/548, 644, 584, 588, 501; 713/300, 500, 713/400; 702/183, 104; 700/117; 455/519, 455/427; 379/221.08; 361/752, 688
See application file for complete search history.

(56) References Cited

U.S. PATENT DOCUMENTS

| | | | |
|---|---|---|---|
| 5,751,967 A | * | 5/1998 | Raab et al. .................. 709/228 |
| 5,974,467 A | * | 10/1999 | Haddock et al. ............ 709/240 |
| 6,128,665 A | * | 10/2000 | Iturralde .................... 709/238 |
| 6,130,892 A | * | 10/2000 | Short et al. ................. 370/401 |
| 6,144,638 A | * | 11/2000 | Obenhuber et al. ........ 370/231 |
| 6,154,770 A | * | 11/2000 | Kostakos ................... 709/217 |
| 6,199,140 B1 | | 3/2001 | Srinivasan et al. |
| 6,219,748 B1 | | 4/2001 | Srinivasan et al. |
| 6,233,626 B1 | * | 5/2001 | Swales et al. ............... 710/11 |
| 6,240,485 B1 | | 5/2001 | Srinivasan et al. |
| 6,272,127 B1 | | 8/2001 | Golden et al. |

(Continued)

OTHER PUBLICATIONS

Saunders, S., "Building Virtual LANS on a Real-World Budget Lanart's Segway Works with Ethernet Switches to Deliver Virtual LANS Powers at a Low Cost", Data Communications, vol. 24, No. 13, Sep. 21, 1995, pp. 39/40.*

(Continued)

*Primary Examiner*—Wing F. Chan
*Assistant Examiner*—Prenell P Jones
(74) *Attorney, Agent, or Firm*—Mark A. Conklin, Esq.; Armstrong Teasdale LLP

(57) ABSTRACT

An Ethernet switch includes a plurality of ports, and the switch is configured to be operable within a temperature range of at least between approximately 0° C. and approximately 60° C. The switch is further configured to be operable within a non-condensing humidity range of at least between approximately 10% and approximately 95%. Also, the switch is configured to support at least one of a Virtual Local Area Network (VLAN), a Quality of Service (QoS), a Remote Monitoring (RMON), and a Spanning Tree.

17 Claims, 1 Drawing Sheet

U.S. PATENT DOCUMENTS

| | | | | |
|---|---|---|---|---|
| 6,466,995 | B2 * | 10/2002 | Swales et al. | 710/11 |
| 6,665,285 | B1 * | 12/2003 | Treadaway et al. | 370/338 |
| 6,728,262 | B1 * | 4/2004 | Woram | 370/466 |
| 6,731,741 | B1 * | 5/2004 | Fourcand et al. | 379/221.08 |
| 6,760,748 | B1 * | 7/2004 | Hakim | 709/204 |
| 6,980,547 | B1 * | 12/2005 | Gally et al. | 370/389 |
| 6,985,750 | B1 * | 1/2006 | Vicknair et al. | 455/519 |
| 7,028,204 | B2 * | 4/2006 | Jammes et al. | 713/400 |
| 2001/0005876 | A1 | 6/2001 | Srinivasan et al. | |
| 2001/0037391 | A1 | 11/2001 | West et al. | |
| 2002/0064149 | A1 * | 5/2002 | Elliott et al. | 370/352 |
| 2003/0055900 | A1 * | 3/2003 | Glas et al. | 709/205 |

OTHER PUBLICATIONS

"Virtual LANS Get Real Ethernet Switch Makers are Taking the Lead in Deploying Virtual LANS Across Campus Networks," Data Communications, vol. 24, No. 3, Mar. 1, 1995.*

Compaq, "Compaq SW5425 Desktop Gigabit Ethernet Switch", Jun. 15, 1999, World Wide QuickSpecs, Version 1, pp. 1-7.* www.arisecomputer.com/singlebrd/DX-4000.asp ; Arise Computer Incorporated; copy right 2000.*

Shenzhen Fiberscape Technology Co., Ltd, Ethernet Switch Specification, www.Alibaba.com; copyright 1999-2006, pp. 1-3.*

Dolemo Corp., EM6208 Series Industrial Ethernet Switches, Hardware Installation Guide, copyright 2001, pp. 1-10.*

Substation Committee of the IEEE Power Engineering Society; IEEE Standard Definition, Specification, and Analysis of Systems Used for Supervisory Control, Data Acquisition, and Automatic Control, Institute of Electrical and Electronic Engineers, Inc., Copyright 1994, ISBN 1-55937-492-2, pp. 35-36 & 51.*

PC EXPO 99, Reviews Online@ www.alltheweb.com & www.reviewonline.com/PCX99-SH.htm, copyright 1999.*

Digi International Inc. Product Data Sheet, Online @ www.alltheweb.com & ww.dgii.com, copy right 1999.*

SuperStack II Switch 9300 Getting Started Guide, Online @ www.alltheweb.com & www.3COM.com, Aug. 1999, entire document.*

Hirshmann, MS4128-5 Switches, Jul. 29, 1997, Hirshmann, www.amazon.com; pp. 1-4.*

Schneider Electric, Ethernet Cabling System, Quick reference guide, Ethernet Hub 100 Mbps 4TX, Fast Ethernet twisted pair Industrial Hub for ISO/DIN Rail, copyright 1999, Schneider Automation, pp. 1-6.*

Siemans, Indusdrial Ethernet with Switching and Fast Ethernet Technology, Oct. 1998, pp. 1-10.*

Hirschmann Press, Dual Speed Hub from Hirschmann Combines Ethernet and Fast Ethernet in one Network, Dec. 31, 1998, Hirschmann Press, p. 1.*

* cited by examiner

ETHERNET SWITCH

BACKGROUND OF INVENTION

This invention relates generally to Ethernet switches, and more particularly, to Ethernet switches in harsh, non-office environments.

If an industrial user or other non-office user desires a feature laden Ethernet switch for use in a harsh environment, the industrial user has heretofore used an office grade switch and has built an environmentally protective enclosure in which to place the office grade switch. The environmentally protective enclosures typically cost more than the office grade switch, and sometimes up to ten times more. Accordingly, the conventional placing of an office grade switch in a user built environmentally protective enclosure tends to be costly and oftentimes not cost-effective.

SUMMARY OF INVENTION

In one aspect, an Ethernet switch is provided. The Ethernet switch includes a plurality of ports, and the switch is configured to be operable within a temperature range of at least between approximately 0° C. and approximately 60° C. The switch is further configured to be operable within a non-condensing humidity range of at least between approximately 10% and approximately 95%. Also, the switch is configured to support at least one of a Virtual Local Area Network (VLAN), a Quality of Service (QoS), a Remote Monitoring (RMON), and a Spanning Tree.

In another aspect, an Ethernet switch is provided that includes a plurality of ports, wherein the switch is configured to support a Virtual Local Area Network (VLAN), a Quality of Service (QoS), a Remote Monitoring (RMON), a Simple Network Management Protocol (SNMP), and a Spanning Tree. The switch is also configured to transmit data at a speed of at least one Gigabyte per second, and be operable within a temperature range of at least between approximately 0° C. and approximately 60° C. Additionally, the switch is configured to be operable within a non-condensing humidity range of at least between approximately 10% and approximately 95% and to be stackable with a second switch. The switch is also configured to be operable under an extended vibration of at least 2 g (gravity).

In a further aspect, an Ethernet network is provided. The network includes a first switch and a plurality of user devices operationally coupled to the first switch such that the first switch transfers data from at least one of the devices to a different one of the devices. The first switch is configured to be operable within a temperature range of at least between approximately 0° C. and approximately 60° C., and be operable within a non-condensing humidity range of at least between approximately 10% and approximately 95%. The first switch is also configured to support at least one of a Virtual Local Area Network (VLAN), a Quality of Service (QoS), a Remote Monitoring (RMON), and a Spanning Tree.

DETAILED DESCRIPTION

Figure 1:
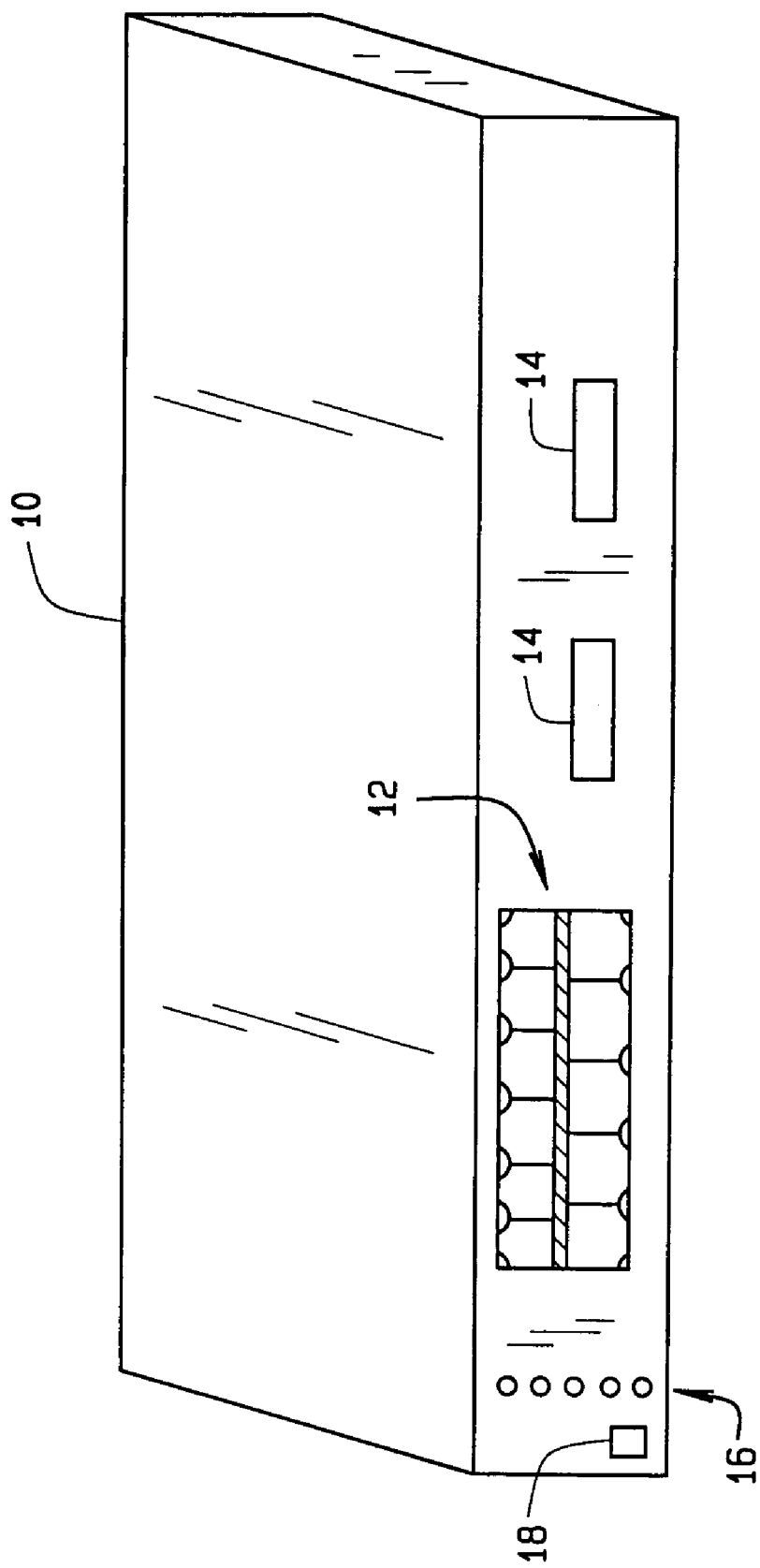
FIG. 1 is a perspective view of a hardened Ethernet switch.

FIG. 1 is a perspective view of a hardened Ethernet switch 10 including a plurality of ports 12. In one embodiment, ports 12 are 10Base-T/100Base-TX autosensing ports with each port 12 delivering up to 200 Mbps of bandwidth. In another embodiment, ports 12 are 10/100 switched ports with integrated inline power. Switch 10 also includes zero or more Gigabyte Ethernet ports 14. In an exemplary embodiment, switch 10 includes six ports 12 and two Gigabyte Ethernet ports 14. Gigabyte Ethernet ports 14 are configured to be one or more of a 1000Base-X port, a 1000Base-T port, a 1000Base-SX port, a 1000Base-LX/LH port, and a 1000Base-ZX port. Ports 12 and 14 accept various cabling mediums including, for example, but not limited to, copper and fiber optic including both single and multi-mode fiber. Switch 10 also includes a plurality of light emitting diodes 16 and an on/off switch 18. Switch 10 provides a Port-based reclassification ability which allows users to reclassify IEEE 802.1p class-of-service (CoS) values on a per-port basis via a command-line interface (CLIs) enabling a fine granularity of control to implement local area network (LAN) edge quality of service (QoS). The Port-based reclassification also enables switch 10 to change the CoS settings of tagged packets on a per-port basis.

For example, with untagged packets, switch 10 uses a default ingress port priority to classify the packets wherein a priority scheduling is applied between a plurality of queues including a low priority queue and a high priority queue. The priority scheduling ensures that the high priority queue is always serviced before scheduling the lower priority traffic. The priority scheduling enables a user to prioritize mission critical traffic, such as Voice over IP (VoIP) and Enterprise Resource Planning (ERP) applications over regular traffic, such as, for example, but not limited to, File Transfer Protocol (FTP) or low-priority Web surfing traffic.

Switch 10 is hardened in that switch 10 is configured to operate in harsh environments with respect to temperature, humidity, and vibration. Specifically, switch 10 remains operational in environments of temperatures between 0° Celsius (C.) and 60° C., a non-condensing humidity range of between 10% and 95%, and an extended vibration level of 2 g (gravity). In an exemplary embodiment, switch 10 also is configured to be operable after sustaining a 4 g shock vibration. In one embodiment, switch 10 remains operational in environments of temperatures between −10° C. and 60° C., a non-condensing humidity range of between 5% and 97%, and an extended vibration level of 3 g. In another embodiment, switch 10 remains operational in environments of temperatures between −15° C. and 75° C., a non-condensing humidity range of between 2% and 98%, and an extended vibration level of 3.5 g. In an exemplary embodiment, switch 10 is hardened as above without utilizing a fan inside of switch 10. Alternatively, switch 10 includes a fan (not shown). In one embodiment, switch 10 has a Mean Time Between Failures (MTBF) of at least 100,000 hours. In an alternative embodiment, switch has a MTBF of at least 150,000 hours.

Additionally, switch 10 can automatically configure Virtual LANs (VLANs) and trusted-extension settings for Internet Protocol (IP) telephones by overlaying a voice topology onto a data network and maintaining the quality of voice traffic. Therefore, a network administrator can segment phones into separate logical networks even though the data and voice infrastructure is physically the same. A user plugs a phone into switch 10, and switch 10 provides the phone with the necessary VLAN information because switch 10 places the phones into their own VLANs without any end-user intervention. Additionally, devices other than phones can be placed in their own VLANs to isolate control and I/O traffic and devices on their own respective VLANs.

In one embodiment, switch 10 is also stackable with other switches 10 to aggregate bandwidth in both a cascade configuration and a star configuration. In either configuration, the stacked switches 10 together operate as a single switch and each switch 10 includes a switch connection port (not shown) and is configurable to be a command switch or a member switch in the switch stack. In alternative embodiments, switches 10 may and or may not be configurable as one unit, but will act as one in all other aspects. For example, operation of multiple switches 10 will be as one, but, in one embodiment, each switch 10 is configured separately. The command switch serves as a single IP address management point and disburses all management instructions dictated by a network administrator. In other words, when a first switch 10 is connected to a second switch 10, the switches (first and second) cooperatively operate as one switch. In one embodiment, switch 10 does not include a switch connection port, and switches 10 are interconnected via Gigabyte Ethernet ports 14. Additionally, switch 10 is configured to autosense, autonegotiate, and autoconfigure. Autosensing on each port 12 detects a speed of an attached device and automatically configures that port 12 for 10 or 100 Mbps operation, facilitating a deployment of switch 10 in a mixed 10Base-T and 100Base-TX environment. Autonegotiating on all ports 12 automatically selects a half- or full-duplex transmission mode to optimize bandwidth. And autoconfiguration facilitates deploying switch 10 in a network by automatically configuring multiple switches across the network via a boot server.

A default configuration is stored in a Flash memory or other type of non-volatile memory (not shown) within switch 10 that ensures that switch 10 can be quickly connected to a network and can pass traffic with little or no user intervention, and preserving configuration in case of a power outage to switch 10. In an exemplary embodiment, switch's 10 operating software is embedded in hardware (e.g., an application specific integrated circuit, ASIC) and total bandwidth of a backplane (not shown) inside switch 10 is at least twice the sum of the bandwidth of all ports 12 and 14 such that switch 10 operates substantially at wire speed. Switch 10 supports Simple Network Management Protocol (SNMP), and switch 10 includes a Telnet interface support that delivers comprehensive in-band management, and a CLI-based management console that provides detailed out-of-band management. In an exemplary embodiment, switch 10 includes an Embedded Remote Monitoring (RMON) software agent that supports four RMON groups (History, Statistics, Alarms, and Events) for enhanced traffic management, monitoring, and analysis. In an alternative embodiment, switch 10 supports all nine RMON groups (Statistics, History, Alarm, Host, HostTopN, Matrix, Filters, Packet Capture, and Events). In other embodiments, switch 10 supports less than all nine RMON groups.

Switch 10 is configured to support IEEE 802.1D Spanning-Tree Protocol such that switch 10 provides for redundant backbone connections and loop-free networks which simplifies network configuration and improves fault tolerance. Switch 10 also includes embedded software enabling QoS features which allow a user to build networks with switch 10 that conform to both the Internet Engineering Task Force (IETF) Integrated Services (intServ) model and/or the Differentiated Services (DiffServ) model.

The embedded QoS features also provide value-added functionality such as network-based application recognition (NBAR) for classifying traffic on an application basis, a service assurance agent (SAA) for end-to-end QoS measurements, and a Resource Reservation Protocol (RSVP) signaling for admission control and reservation of resources. The QoS features provide a solution for controlling available bandwidth and managing it efficiently to meet application demands. The QoS features include mechanisms such as, but not limited to, link fragmentation and interleaving (LFI), Compressed Real-Time Protocol (CRTP), Weighted Fair Queuing (WFQ), and Low-Latency Queuing (LLQ).

The QoS features also support Class-Based Weighted Fair Queuing (CBWFQ), committed access rate (CAR), generic traffic shaping (GTS), and Weighted Random Early Detection (WRED). Switch 10 also supports QoS-enabled virtual private networks (VPNs), non-VPN services, Multiprotocol Label Switching (MPLS), QoS-to-ATM Class of Service (CoS), Frame Relay traffic shaping (FRTS), and Frame Relay Fragmentation (FRF). Switch 10 is configured to map RSVP reservations to an ATM permanent virtual circuit (PVC) and/or a switched virtual circuit (SVC) if desired.

In use, switch 10 is connected to a plurality of user devices such as, but not limited to, a computer, a programmable logic controller (PLC), input-output (I/O) devices, other switches, and all other Ethernet enabled devices. As used herein "user device" refers to any and all Ethernet enabled devices including an internet backbone interface typically provided by a telephone company enabling access to the Internet, and all other Ethernet enabled devices not typically termed "user" devices. Switch 10 transfers data between the user devices and remains operational in harsh environments with temperatures between 0° C. and 60° C., and non-condensing humidity ranges between 10% and 95%. Accordingly, a plurality of user devices are cost efficiently networked together, with many features such as QoS, RMON, and VLAN, in a non-office environment by at least one switch 10.

While the invention has been described in terms of various specific embodiments, those skilled in the art will recognize that the invention can be practiced with modification within the spirit and scope of the claims.

The invention claimed is:

1. An Ethernet switch for use in a non-office environment, said Ethernet switch comprising:
a plurality of ports, said switch configured to operate within a temperature range of at least between approximately 0° C. and approximately 60° C., said switch further configured to operate within a non-condensing humidity range of at least between approximately 10% and approximately 95%, said switch further configured to operate under an extended vibration of at least 2g (gravity), said switch further configured to support at least one of a Virtual Local Area Network (VLAN), a Quality of Service (QoS), a Remote Monitoring (RMON), and a Spanning Tree, wherein said switch automatically configures the VLAN by operating within the temperature range, and wherein said switch is further configured to transfer data between a plurality of devices.

2. A switch in accordance with claim 1 further configured to be stackable with a second switch.

3. A switch in accordance with claim 1 further configured to transmit data at a speed of at least one Gigabyte per second.

4. A switch in accordance with claim 1 further configured to operate substantially at wire speed.

5. A switch in accordance with claim 1 further configured to operate under a shock vibration of at least 4g.

6. A switch in accordance with claim 1 further configured to support a Simple Network Management Protocol (SNMP).

7. A switch in accordance with claim 6 further configured to:
be stackable with a second switch; and
operate under a shock vibration of at least 4g.

8. A switch in accordance with claim 7 further configured to operate substantially at wire speed.

9. A switch in accordance with claim 8 further configured to transmit data at a speed of at least one Gigabyte per second.

10. An Ethernet switch for use in a non-office environment, said Ethernet switch comprising:
a plurality of ports, said switch configured to:
support a Virtual Local Area Network (VLAN), a Quality of Service (QoS), a Remote Monitoring (RMON), and a Spanning Tree;
transmit data at a speed of at least one Gigabyte per second;
operate within a temperature range of at least between approximately 0° C. and approximately 60° C., wherein said switch is further configured to transfer data between a plurality of devices;
operate within a non-condensing humidity range of at least between approximately 10% and approximately 95%;
be stackable with a second switch; and
operate under an extended vibration of at least 2g (gravity).

11. An Ethernet network comprising:
a first switch configured to be used in a non-office environment;
a second switch operationally coupled to said first switch, said second switch and said first switch configured to cooperatively operate as one combined switch; and
a plurality of user devices operationally coupled to said combined switch such that said combined switch transfers data from at least one of said plurality of user devices to a different one of said plurality of user devices, said first switch and said second switch configured to:
operate within a temperature range of at least between approximately 0° C. and approximately 60° C.;
operate within a non-condensing humidity range of at least between approximately 10% and approximately 95%; and
support at least one of a Virtual Local Area Network (VLAN), a Quality of Service (QoS), a Remote Monitoring (RMON), and a Spanning Tree, wherein said combined switch automatically configures the VLAN by operating within the temperature range.

12. A network in accordance with claim 11 wherein said first switch further configured to transmit data at a speed of at least one Gigabyte per second.

13. A network in accordance with claim 11 wherein said first switch further configured to operate under an extended vibration of at least 2g (gravity).

14. A network in accordance with claim 13 wherein said first switch further configured to operate under a shock vibration of at least 4g.

15. A network in accordance with claim 11 wherein said first switch further configured to:
be stackable with said second switch;
operate under an extended vibration of at least 2g (gravity); and
operate under a shock vibration of at least 4g.

16. A network in accordance with claim 15 wherein said first switch further configured to operate substantially at wire speed.

17. A network in accordance with claim 16 wherein said first switch further configured to transmit data at a speed of at least one Gigabyte per second.

* * * * *